(12) United States Patent
Hisano et al.

(10) Patent No.: US 11,755,144 B2
(45) Date of Patent: Sep. 12, 2023

(54) SENSOR SYSTEM

(71) Applicant: Wacom Co., Ltd., Saitama (JP)

(72) Inventors: Haruhiko Hisano, Saitama (JP); Sadao Yamamoto, Saitama (JP); Jun Kadowaki, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 17/574,411

(22) Filed: Jan. 12, 2022

(65) Prior Publication Data

US 2022/0137778 A1  May 5, 2022

Related U.S. Application Data

(63) Continuation of application No. PCT/JP2020/044813, filed on Dec. 2, 2020.

(30) Foreign Application Priority Data

Dec. 19, 2019 (JP) ................. 2019-229210

(51) Int. Cl.
G06F 3/041 (2006.01)
G06F 3/14 (2006.01)
G06F 1/16 (2006.01)
G06F 3/0354 (2013.01)

(52) U.S. Cl.
CPC ........ G06F 3/04166 (2019.05); G06F 3/0412 (2013.01); G06F 3/1423 (2013.01); *G06F 1/1618* (2013.01); *G06F 3/03545* (2013.01); *G06F 2203/04104* (2013.01)

(58) Field of Classification Search
CPC .................................................. G06F 3/03545
See application file for complete search history.

(56) References Cited

U.S. PATENT DOCUMENTS

| | | | |
|---|---|---|---|
| 2012/0127087 A1* | 5/2012 | Ma | G06F 1/1652 345/173 |
| 2017/0344171 A1* | 11/2017 | Qiao | G06F 3/038 |
| 2019/0179475 A1* | 6/2019 | Seo | G06F 3/0442 |
| 2019/0235646 A1* | 8/2019 | Karsuntsev | G06F 3/03545 |

FOREIGN PATENT DOCUMENTS

| | | |
|---|---|---|
| JP | 64-31221 A | 2/1989 |
| JP | 2010-002946 A | 1/2010 |
| JP | 2010-277126 A | 12/2010 |
| JP | 2012-173914 A | 9/2012 |
| JP | 2017-207915 A | 11/2017 |
| JP | 2019-133487 A | 8/2019 |
| JP | 2020-154836 A | 9/2020 |
| WO | 2020/162167 | 8/2020 |

OTHER PUBLICATIONS

International Search Report, dated Feb. 16, 2021, for International Application No. PCT/JP2020/044813, 7 pages.

* cited by examiner

*Primary Examiner* — Robin J Mishler
(74) *Attorney, Agent, or Firm* — Seed IP Law Group LLP

(57) ABSTRACT

A sensor system includes first sensor electrode groups and a first integrated circuit, and second sensor electrode groups and a second integrated circuit. The first integrated circuit and the second integrated circuit are controlled such that a first uplink signal, which is transmitted from the first integrated circuit via the first sensor electrode groups, and a second uplink signal, which is transmitted from the second integrated circuit via the second sensor electrode groups, are not transmitted at the same time.

7 Claims, 7 Drawing Sheets

FIG. 5A
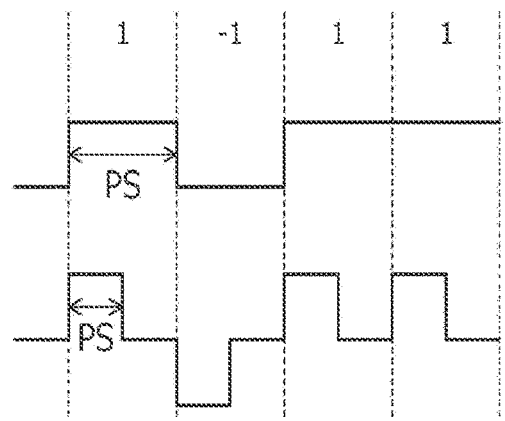
FIG. 5B
FIG. 6
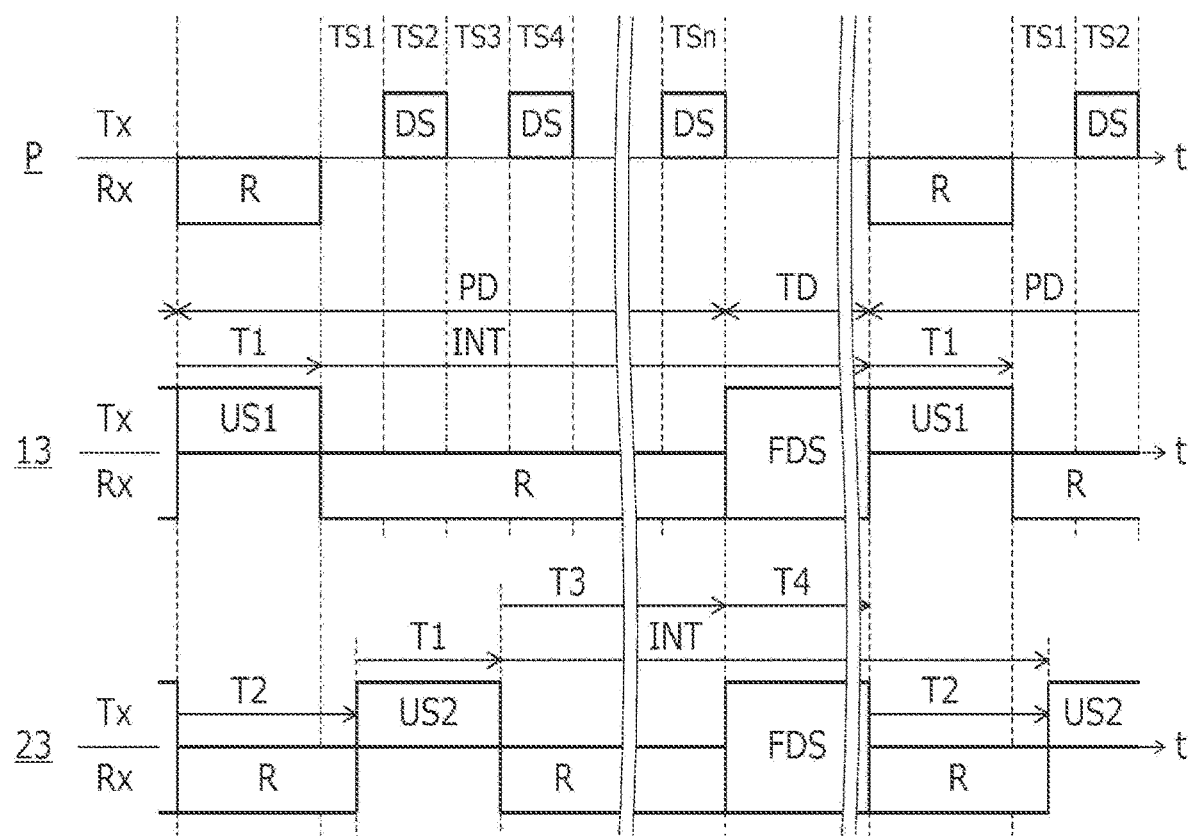

SENSOR SYSTEM

BACKGROUND

Technical Field

The present invention relates to a sensor system, and in particular, to a sensor system for a dual-screen model.

Description of the Related Art

In recent years, electronic devices of a type having two screens have been developed. This type of electronic device will be hereinafter referred to as a "dual-screen model." Along with the development of the dual-screen model, a technology has been developed for enabling input by a stylus (hereinafter referred to as "pen input") and input by a finger (hereinafter referred to as "touch input") on each of the two screens.

Patent Document 1 discloses an example of such a technology. As described in Patent Document 1, a dual-screen model includes a sensor system that includes an integrated circuit and a sensor electrode group for a first screen, an integrated circuit and a sensor electrode group for a second screen, and a host processor connected to each integrated circuit. The sensor system realizes the pen input and the touch input.

PRIOR ART DOCUMENT

Patent Document

Patent Document 1: Japanese Patent Laid-Open No. 2019-133487

BRIEF SUMMARY

Technical Problems

Some styluses are configured to receive an uplink signal transmitted from a screen and operate according to the received uplink signal. In order to enable the use of this type of stylus with a dual-screen model, it is necessary to prevent interference between uplink signals transmitted from the two screens, respectively.

Therefore, one aspect of the present invention is to provide a sensor system that can prevent interference between the uplink signals respectively transmitted from the two screens disposed in the dual-screen model.

Further, when pen input is used in the dual-screen model, it is preferable that a stylus that has started to be used on one screen can continuously be used on the other screen to which the pen tip is moved.

Therefore, another aspect of the present disclosure is to provide a sensor system that enables continuous use of the stylus across the two screens included in the dual-screen model.

Further, when touch input is used in the dual-screen model, if a user touches both of the two screens at the same time, there is a possibility that a finger touch detection signal that is being transmitted from one integrated circuit is received by the other integrated circuit. Such reception needs to be avoided because this causes malfunction of the integrated circuit and a host processor.

Therefore, yet another aspect of the present disclosure is to provide a sensor system that can prevent the finger touch detection signal that is being transmitted from one integrated circuit from being received by the other integrated circuit.

Further, conventionally, two integrated circuits in a dual-screen model have operated without being synchronized with each other. Therefore, there have been cases where a host processor incorrectly processes a sequence of position data supplied from each integrated circuit, as a result of which drawing results are affected.

Therefore, still another aspect of the present disclosure is to provide a sensor system in which the host processor can correctly process the sequence of the position data supplied from each integrated circuit.

Technical Solution

A sensor system according to a first aspect of the present disclosure includes a first sensor electrode group and a first integrated circuit connected to the first sensor electrode group, and a second sensor electrode group and a second integrated circuit connected to the second sensor electrode group. The first and second integrated circuits are controlled such that a first uplink signal that is transmitted from the first integrated circuit via the first sensor electrode group and a second uplink signal that is transmitted from the second integrated circuit via the second sensor electrode group are not transmitted at the same time.

A sensor system according to a second aspect of the present disclosure includes a first sensor electrode group and a first integrated circuit connected to the first sensor electrode group, and a second sensor electrode group and a second integrated circuit connected to the second sensor electrode group. When the first integrated circuit is paired with a stylus, the first integrated circuit shares pairing information regarding the pairing, with the second integrated circuit.

A sensor system according to a third aspect of the present disclosure includes a first sensor electrode group and a first integrated circuit connected to the first sensor electrode group, and a second sensor electrode group and a second integrated circuit connected to the second sensor electrode group. While one of the first and second integrated circuits is performing a touch input detection operation, the other one of the first and second integrated circuits is restricted from performing the touch input detection operation.

A sensor system according to a fourth aspect of the present disclosure includes a first sensor electrode group and a second sensor electrode group, a first integrated circuit configured to perform a touch input detection operation by supplying a first finger touch detection signal to the first sensor electrode group, and a second integrated circuit configured to perform the touch input detection operation by supplying a second finger touch detection signal to the second sensor electrode group. The first and second finger touch detection signals are pulse signals configured such that temporal positions of edges of their respective pulse sections are different from each other.

A sensor system according to a fifth aspect of the present disclosure includes a first sensor electrode group and a first integrated circuit connected to the first sensor electrode group, and a second sensor electrode group and a second integrated circuit connected to the second sensor electrode group. The first and second integrated circuits each perform a touch input detection operation in synchronization with each other.

Advantageous Effects

According to the first aspect of the present disclosure, the first and second uplink signals are not transmitted at the same time. Therefore, it is possible to prevent interference between the uplink signals transmitted from two screens disposed in a dual-screen model.

According to the second aspect of the present disclosure, the pairing information is shared between the first and second integrated circuits. This enables continuous use of the stylus across the two screens included in the dual-screen model.

According to the third aspect of the present disclosure, while one integrated circuit is performing the touch input detection operation, the other integrated circuit is restricted from performing the touch input detection operation. Therefore, it is possible to prevent the finger touch detection signal that is being transmitted from one integrated circuit from being received by the other integrated circuit.

According to the fourth aspect of the present disclosure, the temporal positions of the edges of their respective pulse sections are different from each other between the first finger touch detection signal and the second finger touch detection signal. Therefore, it is possible to prevent the finger touch detection signal that is being transmitted from one integrated circuit from being received by the other integrated circuit.

According to the fifth aspect of the present disclosure, the first and second integrated circuits each perform the touch input detection operation in synchronization with each other. Therefore, a host processor can correctly process the sequence of position data supplied from each integrated circuit.

BRIEF DESCRIPTION OF THE SEVERAL VIEWS OF THE DRAWINGS

FIGS. 5A and 5B are diagrams each illustrating an example of specific waveforms of signals $s_1$ to $s_K$ that constitute a finger touch detection signal FDS.

FIG. 6 is a timing diagram of signals transmitted and received by each of the first integrated circuit 13, the second integrated circuit 23, and a stylus P.

DETAILED DESCRIPTION

Embodiments of the present disclosure will be described in detail below with reference to the drawings.

Figure 1:
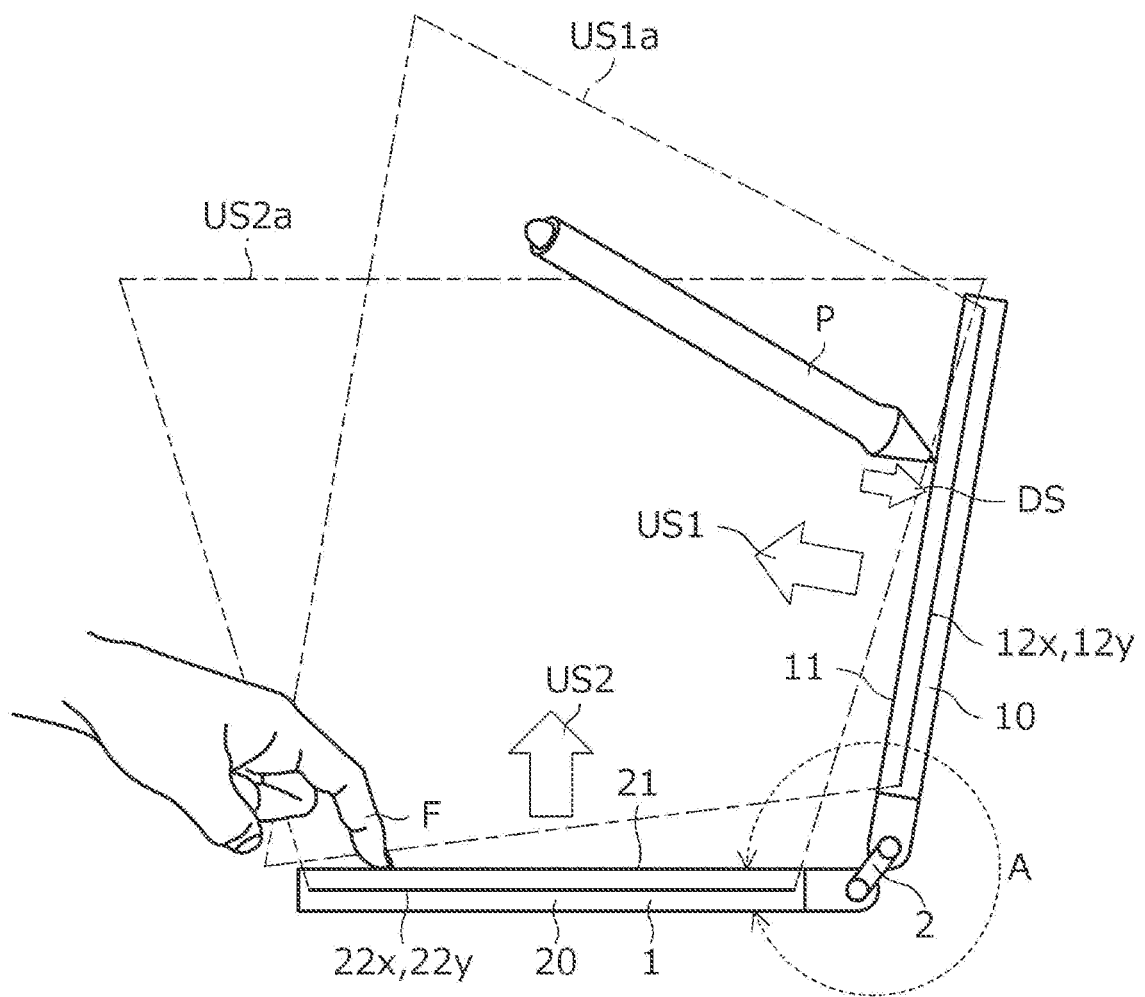
FIG. 1 is a diagram illustrating an external appearance of an electronic device 1 according to a first embodiment of the present disclosure.
Figure 2:
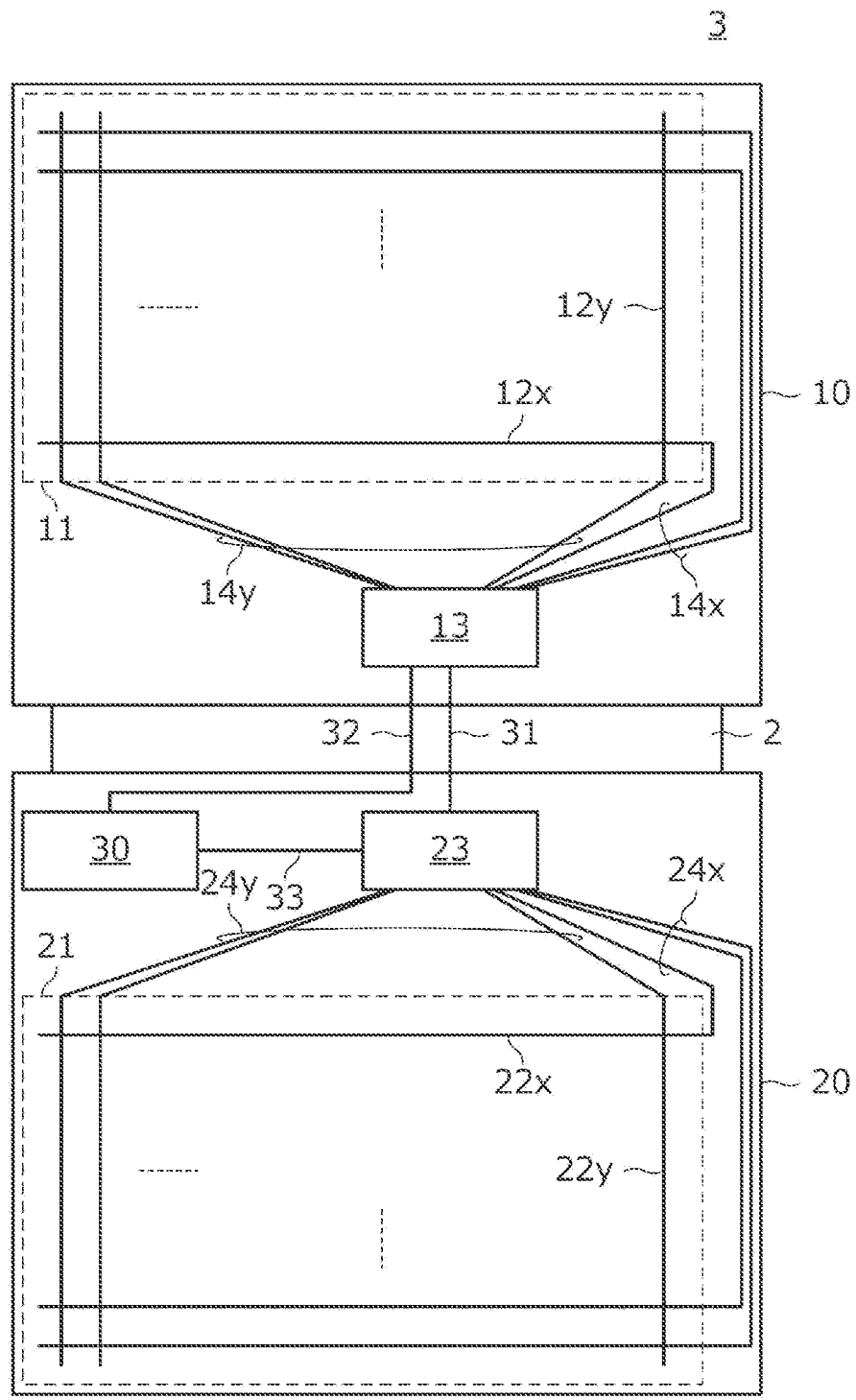
FIG. 2 is a diagram illustrating a configuration of a sensor system 3, which is included in the electronic device 1.

FIG. 1 is a diagram illustrating an external appearance of an electronic device 1 according to a first embodiment of the present disclosure. A stylus P and a finger F to be detected by the electronic device 1 are also illustrated in this figure. FIG. 2 is a diagram illustrating a configuration of a sensor system 3, which is disposed in the electronic device 1 to detect the stylus P and the finger F.

As illustrated in FIG. 1, the electronic device 1 includes a first housing 10 and a second housing 20, which are connected to each other by a connecting portion 2. The connecting portion 2 includes a hinge and a flexible substrate. The first housing 10 is configured to be rotatable through 360° around the connecting portion 2 as denoted by an illustrated dashed arrow A. The flexible substrate is a substrate configured to deform at an angle corresponding to relative positions of the first housing 10 and the second housing 20. In the flexible substrate, wires are arranged for connecting between wires in the first housing 10 and wires in the second housing 20.

The first housing 10 has a first panel surface 11, and the second housing 20 has a second panel surface 21. The surface of each of the first panel surface 11 and the second panel surface 21 is flat. A user can slide a pen tip of the stylus P and the finger F on the surfaces of the first panel surface 11 and the second panel surface 21. Further, the first panel surface 11 and the second panel surface 21 are each disposed on a surface of the corresponding housing such that the first panel surface 11 and the second panel surface 21 face the same direction when the first housing 10 is set at a 180° position. Both the first panel surface 11 and the second panel surface 21 have a rectangular shape and are disposed such that their respective long-side directions are perpendicular to a direction in which the first panel surface 11 and the second panel surface 21 are aligned when the first housing 10 is set at the 180° position.

Here, each of the first panel surface 11 and the second panel surface 21 may or may not serve as a display surface for display. As specific systems to make each of the first panel surface 11 and the second panel surface 21 function as the display surface of the display, an in-cell system, an on-cell system, an out-cell system, or any other various systems can be employed. In the case of the in-cell system, part of electrodes for driving pixels in the display (e.g., common electrodes of a liquid-crystal display) function as part of sensor electrode groups to be described later (e.g., a plurality of sensor electrodes $12x$ or a plurality of sensor electrodes $22x$ to be described later). In the case of the on-cell system, although the sensor electrode groups to be described later are disposed in the display, the sensor electrode groups are disposed separately from the electrodes for driving the pixels in the display. In the case of the out-cell system, the sensor electrode groups to be described later are disposed on a display panel. In cases where both the first panel surface 11 and the second panel surface 21 serve as the display surfaces of the displays, the electronic device 1 functions as the dual-screen model described above.

Referring now to FIG. 2, the sensor system 3 includes first sensor electrode groups $12x$ and $12y$, a first integrated circuit 13, first lead-out wires (lines/traces) $14x$ and $14y$, second sensor electrode groups $22x$ and $22y$, a second integrated circuit 23, second lead-out wires (lines/traces) $24x$ and $24y$, and a host processor 30. Of these, the first sensor electrode groups $12x$ and $12y$, the first integrated circuit 13, and the first lead-out wires $14x$ and $14y$ are disposed in the first housing 10, while the second sensor electrode groups $22x$ and $22y$, the second integrated circuit 23, the second lead-out wires $24x$ and $24y$, and the host processor 30 are disposed in the second housing 20. It is noted that, although the host processor 30 is disposed in the second housing 20, this arrangement is a mere example and the host processor 30 may be disposed in the first housing 10.

As illustrated in FIG. 2, the first integrated circuit 13 and the second integrated circuit 23 are connected to each other via a wire (line/trace) 31. Further, the first integrated circuit 13 and the second integrated circuit 23 are connected to the host processor 30 via wires (lines/traces) 32 and 33, respectively. Part of the wires 31 and 32 extend into the above-described flexible substrate. It is noted that, although each of the wires 31 to 33 is depicted by a single line in FIG. 2, each of the wires 31 to 33 is a set of multiple wires in actual implementation.

The first sensor electrode groups 12x and 12y are disposed inside the first panel surface 11 as also illustrated in FIG. 1. Similarly, the second sensor electrode groups 22x and 22y are disposed inside the second panel surface 21. The first sensor electrode groups 12x and 12y respectively include the plurality of sensor electrodes 12x and a plurality of sensor electrodes 12y. The plurality of sensor electrodes 12x, each of which extends along a long-side direction of the first panel surface 11, are arranged at equal intervals along a short-side direction of the first panel surface 11. The plurality of sensor electrodes 12y, each of which extends along the short-side direction of the first panel surface 11, are arranged at equal intervals along the long-side direction of the first panel surface 11. Further, the second sensor electrode groups 22x and 22y respectively include the plurality of sensor electrodes 22x and a plurality of sensor electrodes 22y. The plurality of sensor electrodes 22x, each of which extends along a long-side direction of the second panel surface 21, are arranged at equal intervals along a short-side direction of the second panel surface 21. The plurality of sensor electrodes 22y, each of which extends along the short-side direction of the second panel surface 21, are arranged at equal intervals along the long-side direction of the second panel surface 21.

The first integrated circuit 13 is connected to each sensor electrode 12x via the corresponding one of the first lead-out wires 14x. The first lead-out wires 14x are arranged so as to correspond one-to-one to the sensor electrodes 12x. The first integrated circuit 13 is also connected to each sensor electrode 12y via the corresponding one of the first lead-out wires 14y. The first lead-out wires 14y are arranged so as to correspond one-to-one to the sensor electrodes 12y. Similarly, the second integrated circuit 23 is connected to each sensor electrode 22x via the corresponding one of the second lead-out wires 24x. The second lead-out wires 24x are arranged so as to correspond one-to-one to the sensor electrodes 22x. The second integrated circuit 23 is also connected to each sensor electrode 22y via the corresponding one of the second lead-out wires 24y. The second lead-out wires 24y are arranged so as to correspond one-to-one to the sensor electrodes 22y.

The first integrated circuit 13 has a function of detecting the stylus P and the finger F present on the first panel surface 11, a function of deriving the position of the detected stylus P or finger F within the first panel surface 11 and supplying position data indicating the derived position to the host processor 30, and a function of bidirectionally transmitting and receiving signals to and from the stylus P via the first sensor electrode groups 12x and 12y. Similarly, the second integrated circuit 23 has a function of detecting the stylus P and the finger F present on the second panel surface 21, a function of deriving the position of the detected stylus P or finger F within the second panel surface 11 and supplying position data indicating the derived position to the host processor 30, and a function of bidirectionally transmitting and receiving signals to and from the stylus P via the second sensor electrode groups 22x and 22y. The first integrated circuit 13 and the second integrated circuit 23 are configured to execute these functions in synchronization with each other, either under the control of the host processor 30 or by communicating with each other via the wire 31.

In the following description, a signal transmitted from the first integrated circuit 13 to the stylus P will be referred to as a first uplink signal US1, and a signal transmitted from the second integrated circuit 23 to the stylus P will be referred to as a second uplink signal US2. It is noted that, when the first uplink signal US1 and the second uplink signal US2 do not need to be distinguished from each other, the first uplink signal US1 and the second uplink signal US2 may be collectively referred to as an uplink signal US. Further, a signal transmitted from the stylus P will be referred to as a downlink signal DS.

A region US1a illustrated in FIG. 1 is a range that the first uplink signal US1 can reach. Further, a region US2a illustrated in FIG. 1 is a range that the second uplink signal US2 can reach. As is clear from the description of FIG. 1, the region US1a and the region US2a overlap with each other depending on the angle formed between the first housing 10 and the second housing 20. The stylus P present within this overlapping region can receive both the first uplink signal US1 and the second uplink signal US2. Therefore, it is necessary to prevent interference between the first uplink signal US1 and the second uplink signal US2 in the electronic device 1.

Referring back to FIG. 2, the host processor 30 is a central processing unit of the electronic device 1 that executes an operating system and various applications of the electronic device 1 by reading and executing programs stored in a memory, which is not illustrated. The host processor 30 also plays a role of accepting pen input by the stylus P or touch input by the finger F via the first integrated circuit 13 and the second integrated circuit 23 and supplying the pen input or touch input to the operating system or an application. Examples of the application that operate in response to receipt of pen input or touch input include a drawing application. This type of application generates and draws stroke data based on the pen input or touch input.

Figure 3:
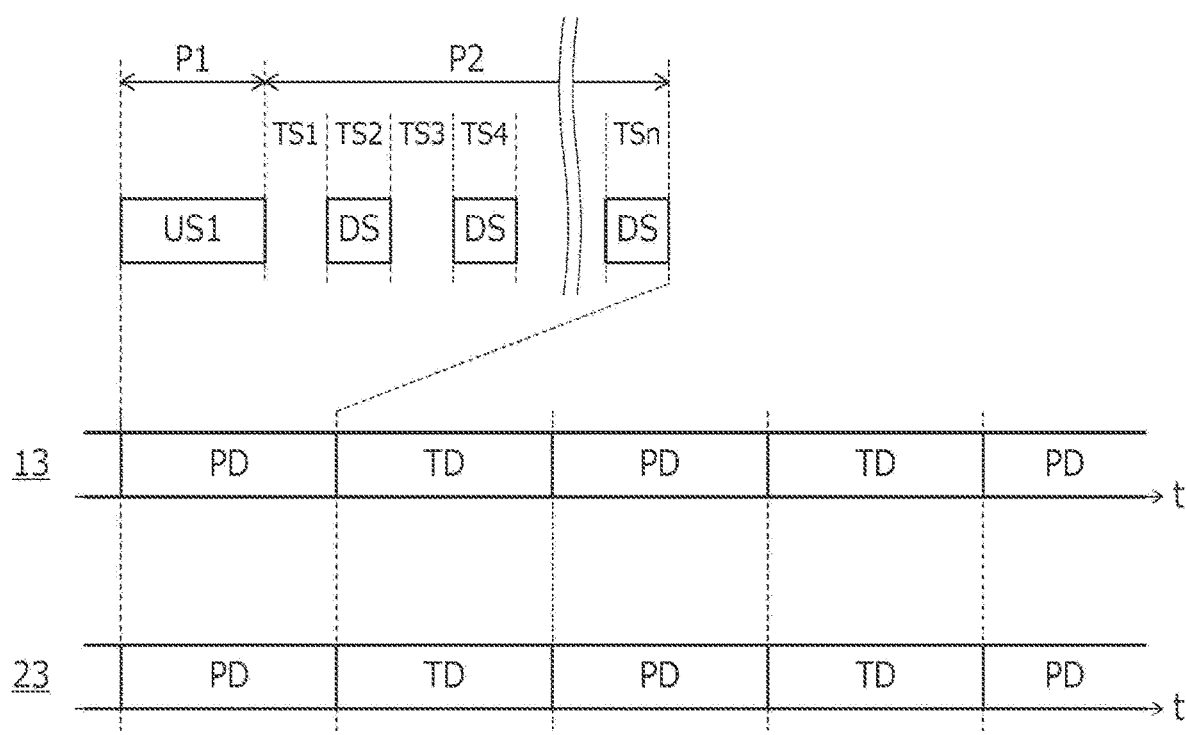
FIG. 3 is a timing diagram illustrating an overview of operations of a first integrated circuit 13 and a second integrated circuit 23.

FIG. 3 is a timing diagram illustrating an overview of operations of the first integrated circuit 13 and the second integrated circuit 23. As illustrated in this figure, the first integrated circuit 13 and the second integrated circuit 23 are configured to alternately and repeatedly perform a pen detection operation PD for detecting the stylus P and a touch detection operation TD for detecting the finger F at the same timing.

The overview of each of the pen detection operation PD and the touch detection operation TD will be described below. It is noted that, although the following description takes the first integrated circuit 13 as an example, the description similarly applies to the second integrated circuit 23.

First, the pen detection operation PD will be described. As illustrated in FIG. 3, a period in which the pen detection operation PD is performed includes an uplink signal US transmission/reception period P1 and a downlink signal DS transmission/reception period P2. Of these, the downlink signal DS transmission/reception period P2 is divided into a plurality of time slots TS1 to TSn, enabling a plurality of styluses P to transmit the downlink signal DS by time division multiplexing. Although not illustrated, another multiplexing method such as frequency division multiplexing or orthogonal frequency division multiplexing may be used in addition to or instead of time division multiplexing. The following description continues, taking as an example a case where time division multiplexing and frequency division multiplexing are used.

The first integrated circuit 13 is configured to periodically transmit the first uplink signal US1 that includes pairing information by using the uplink signal US transmission/reception period P1. The pairing information specifies a local pen ID (Identifier), a time slot, and a frequency to be allocated to a newly detected stylus P. When the stylus P that has received this first uplink signal US1 has not been paired with any of the integrated circuits, the stylus P transmits the downlink signal DS that includes a pen ID stored in its memory, by using the time slot and frequency indicated by the first uplink signal US1. At the same time, the stylus P stores the pairing information included in the first uplink signal US1 in its memory.

Here, each time slot included in the transmission/reception period P2 is assigned a number in advance, and the first integrated circuit 13 is configured to specify a time slot by specifying the assigned number. The stylus P is configured to determine a temporal position of each time slot based on a timing at which the first uplink signal US1 has been received and then transmit the downlink signal DS in the time slot allocated by the pairing information. The example illustrated in FIG. 3 is a case where time slots TS2, TS4, and TSn are allocated by the pairing information.

The first integrated circuit 13 that has received the downlink signal DS stores the received pen ID in its memory in association with the above-described pairing information. Pairing between the first integrated circuit 13 and the stylus P is completed through the processing up to this point. After that, the first integrated circuit 13 transmits the first uplink signal US1 including the local pen ID and a command as necessary to instruct the paired stylus P what data the stylus P should transmit.

The stylus P is configured to transmit a position signal and a data signal as the downlink signal DS. The position signal is a burst signal. The data signal is a signal obtained by modulating a predetermined carrier signal by using the data indicated (requested) by the first uplink signal US1. The first integrated circuit 13 derives the position of the stylus P based on reception strength of the position signal at each of the sensor electrodes 12x and 12y, and obtains the data transmitted from the stylus P by receiving and demodulating the data signal. The first integrated circuit 13 then outputs the position data indicating the derived position and the data obtained from the stylus P to the host processor 30.

Figure 4:
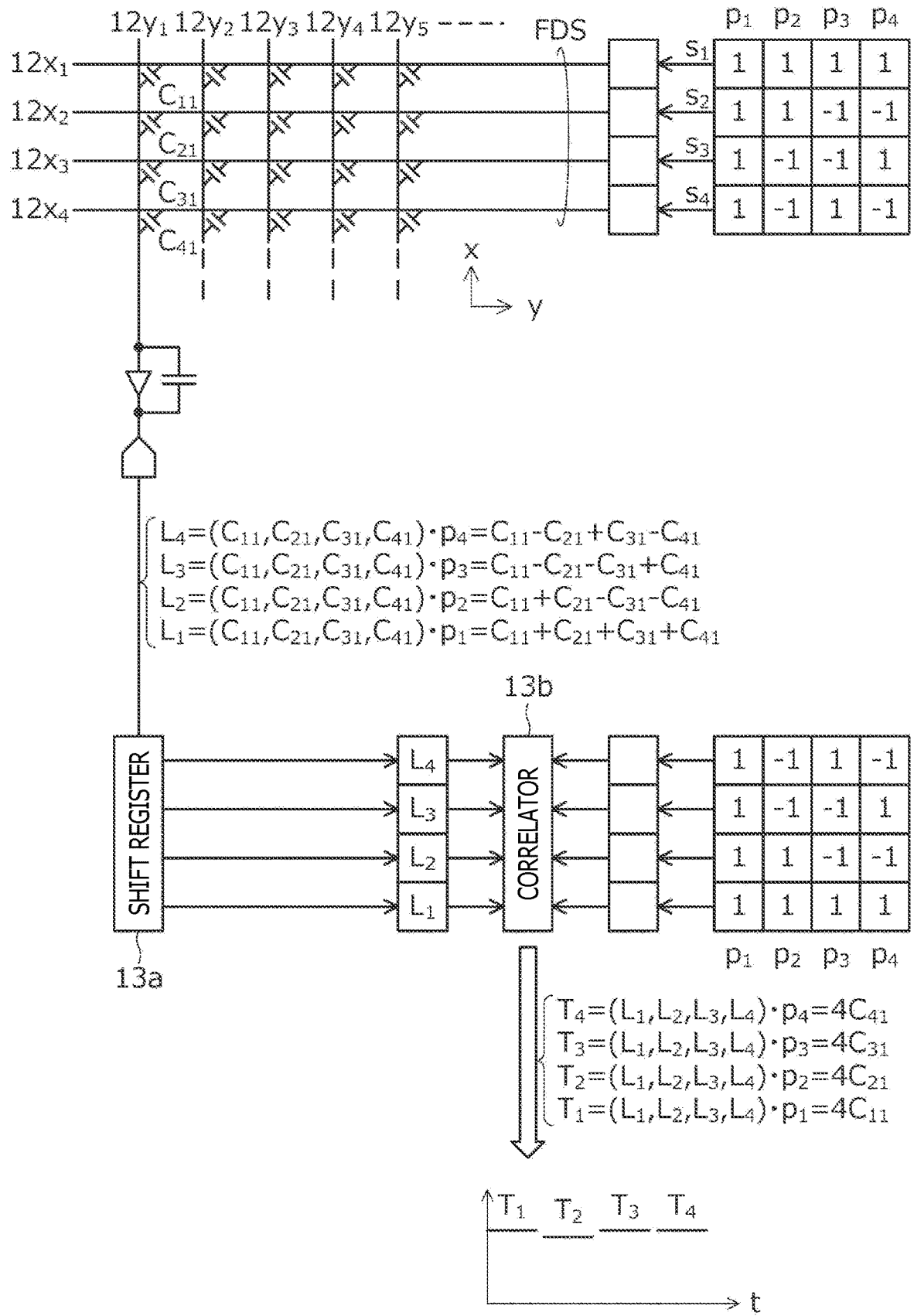
FIG. 4 is a diagram illustrating a principle of a touch detection operation TD.

Next, the touch detection operation TD will be described. FIG. 4 is a diagram illustrating a principle of the touch detection operation TD. Although only four sensor electrodes 12x are illustrated in this figure to simplify illustration, more sensor electrodes 12x are arranged in actual implementation. The following description continues, assuming that the number of sensor electrodes 12x is K.

The first integrated circuit 13 when performing the touch detection operation TD supplies a finger touch detection signal FDS to each sensor electrode 12x. As illustrated in FIG. 4, the finger touch detection signal FDS includes K signals $s_1$ to $s_K$. Each of the K signals $s_1$ to $s_K$ is made up of K pulses each represented by "1" or "−1," for example. The nth pulses (n=1 to K) of the respective signals $s_1$ to $s_K$ constitute a pulse group $p_n$. The pluses constituting one pulse group $P_n$ are individually input into the respective sensor electrodes 12x in parallel.

While the number of sensor electrodes 12x is assumed to be four (i.e., K=4) in the following description, the description similarly applies to a case where the number of sensor electrodes 12x is three or less or five or more. When the number of sensor electrodes 12x is four, each of the signals $s_1$ to $s_K$ is made up of four pulses each represented by "1" or "−1." Specifically, as illustrated in FIG. 4, the signal $s_1$ is made up of "1, 1, 1, 1," the signal $s_2$ is made up of "1, 1, −1, −1," the signal $s_3$ is made up of "1, −1, −1, 1," and the signal $s_4$ is made up of "1−1, 1, −1."

The first integrated circuit 13 includes a shift register 13a and a correlator 13b. The shift register 13a is a FIFO (First-In First-Out)-type storage unit and is configured to store the same number (i.e., K) of pieces of data as the number of sensor electrodes 12x. When new data is stored in the shift register 13a, the data that has been stored K times prior is deleted from the shift register 13a. The first integrated circuit 13 selects one sensor electrode 12y and sequentially inputs the pulse groups $p_1$ to $p_4$ to each sensor electrode 12x. The first integrated circuit 13 repeats this operation for each sensor electrode 12y. Accordingly, four levels $L_1$ to $L_4$ corresponding to the respective pulse groups $p_1$ to $p_4$ sequentially appear in the selected sensor electrode 12y. The first integrated circuit 13 sequentially obtains the levels $L_1$ to $L_4$ appearing in the sensor electrode 12y in this way, and each time the first integrated circuit 13 obtains the level, the first integrated circuit 13 stores the obtained level in the shift register 13a.

The specific contents of the levels $L_1$ to $L_4$ will be described in detail, taking as an example a case where a sensor electrode $12y_1$ illustrated in FIG. 4 is selected. In the following description, capacitances formed between the sensor electrode $12y_1$ and four sensor electrodes $12x_1$ to $12x_4$ will be referred to as $C_{11}$ to $C_{41}$, respectively.

First, the level $L_1$ corresponding to the pulse group $p_1$ and stored in the shift register 13a is an inner product of a capacitance vector ($C_{11}$, $C_{21}$, $C_{31}$, $C_{41}$) and a vector (1, 1, 1, 1) indicating the pulse group $p_1$. This inner product is calculated as $C_{11}+C_{21}+C_{31}+C_{41}$ as also illustrated in FIG. 4. Similarly, the level $L_2$ corresponding to the pulse group $p_2$ and stored in the shift register 13a is an inner product of the capacitance vector ($C_{11}$, $C_{21}$, $C_{31}$, $C_{41}$) and a vector (1, 1, −1, −1) indicating the pulse group $p_1$, which is calculated as $C_{11}+C_{21}-C_{31}-C_{41}$. The level $L_3$ corresponding to the pulse group $p_3$ and stored in the shift register 13a is an inner product of the capacitance vector ($C_{11}$, $C_{21}$, $C_{31}$, $C_{41}$) and a vector (1, −1, −1, 1) indicating the pulse group $p_3$, which is calculated as $C_{11}-C_{21}-C_{31}+C_{41}$. The level $L_4$ corresponding to the pulse group $p_4$ and stored in the shift register 13a is an inner product of the capacitance vector ($C_{11}$, $C_{21}$, $C_{31}$, $C_{41}$) and a vector (1, −1, 1, −1) indicating the pulse group $p_4$, which is calculated as $C_{11}-C_{21}+C_{31}-C_{41}$.

The first integrated circuit 13 uses the correlator 13b to sequentially calculate correlation values $T_1$ to $T_4$ correlating with the levels $L_1$ to $L_4$ accumulated in the shift register 13a for the respective four pulse groups $p_1$ to $p_4$. As illustrated in FIG. 4, the specific contents of the correlation values $T_1$ to $T_4$ calculated in this way are $4C_{11}$, $4C_{21}$, $4C_{31}$, and $4C_{41}$, respectively. That is, the correlation values $T_1$ to $T_4$ each reflect changes in capacitances formed at intersections of the sensor electrodes $12x_1$ to $12x_4$ and the sensor electrode $12y_1$. Therefore, the first integrated circuit 13 can detect the position of the finger F by referring to the correlation values $T_1$ to $T_4$ calculated for each sensor electrode 12y. Specifically, it suffices that the first integrated circuit 13 determines a region within the first panel surface 11 where changes in capacitances are equal to or greater than a predetermined value and detects the center position of the region as the position of the finger F, for example. The first integrated circuit 13 is configured to also output the position data indicating the position detected in this way to the host processor 30.

FIGS. 5A and 5B are diagrams each illustrating an example of specific waveforms of the signals $s_1$ to $s_K$ that constitute the finger touch detection signal FDS. The signals $s_1$ to $s_K$ according to a first example illustrated in FIG. 5A include signals representing "1" by a relatively high voltage and "−1" by a relatively low voltage. Meanwhile, the signals $s_1$ to $s_K$ according to a second example illustrated in FIG. 5B include signals obtained by Manchester-encoding the signals $s_1$ to $s_K$ according to the first example. Specifically, each signal representing a signal value consists of a first half portion, which represents "1" or "−1" depending on a high or low voltage, and a latter half portion, which represents the intermediate voltage. In the following description, a section in which the value of "1" or "−1" is reflected in the voltage may be occasionally referred to as a single pulse section PS, as illustrated in FIGS. 5A and 5B.

Next, a configuration of the sensor system 3 that relates to the characteristics of the present disclosure will be described in detail with reference to FIGS. 6 to 8.

FIG. 6 is a timing diagram of signals transmitted and received by each of the first integrated circuit 13, the second integrated circuit 23, and the stylus P. Illustrated in this figure is a state in which the first integrated circuit 13 and the stylus P have already been paired.

As illustrated in FIG. 6, the sensor system 3 according to the present embodiment controls the first integrated circuit 13 and the second integrated circuit 23 such that the first uplink signal US1, which is transmitted from the first integrated circuit 13 via the first sensor electrode groups 12x and 12y, and the second uplink signal US2, which is transmitted from the second integrated circuit 23 via the second sensor electrode groups 22x and 22y, are not transmitted at the same time. Specifically, the host processor 30 may control the first integrated circuit 13 and the second integrated circuit 23 such that the first uplink signal US1 and the second uplink signal US2 are not transmitted at the same time, or the first integrated circuit 13 and the second integrated circuit 23 may communicate with each other so as to control the first integrated circuit 13 and the second integrated circuit 23 such that the first uplink signal US1 and the second uplink signal US2 are not transmitted at the same time.

As a result of such processing, in the example illustrated in FIG. 6, the first uplink signal US1 is transmitted within a period of a time length T1 from the beginning of the period in which the pen detection operation PD is performed, whereas the second uplink signal US2 is transmitted after a time length T2 (>T1), which is longer than the time length T1, has elapsed since the beginning of the pen detection operation PD. As a result, the first uplink signal US1 and the second uplink signal US2 are not transmitted at the same time. Accordingly, it is possible to prevent interference between the uplink signal US transmitted from the first panel surface 11 and the uplink signal US transmitted from the second panel surface 21.

In addition, the first integrated circuit 13 further controls the paired stylus P such that the paired stylus P does not perform a receiving operation (denoted as "R" in FIG. 6) except for a period in which the first uplink signal US1 is being transmitted. Specifically, at the time of pairing, the first integrated circuit 13 notifies the stylus P of a time length INT illustrated in FIG. 6. The time length INT represents an interval between transmissions of the uplink signal US. After receiving the uplink signal US, the stylus P operates so as to stop the receiving operation during the notified time length INT. Accordingly, it is possible to prevent the stylus P paired with the first integrated circuit 13 from receiving the uplink signal US transmitted from the second integrated circuit 23.

Although this description similarly applies to the second integrated circuit 23, it is preferable that, at the time of pairing, the second integrated circuit 23 further notify the stylus P of a time length T3 (a time length from the end of transmission of the second uplink signal US2 to the start of the touch detection operation TD) and a time length T4 (a time length of a period in which the touch detection operation TD is performed) illustrated in FIG. 6. In this way, based on the timing at which the second uplink signal US2 has been received, the stylus P can determine the temporal position of each time slot for transmitting the downlink signal DS while excluding the period in which the touch detection operation TD is performed.

Further, the first integrated circuit 13 and the second integrated circuit 23 are configured such that, when one of the first integrated circuit 13 and the second integrated circuit 23 is paired with the stylus P, the pairing information regarding the pairing is shared with the other one of the first integrated circuit 13 and the second integrated circuit 23. In sharing the pairing information, one of the first integrated circuit 13 and the second integrated circuit 23 may transmit the pairing information to the host processor 30 and the host processor 30 may transmit this pairing information to the other one of the first integrated circuit 13 and the second integrated circuit 23, or one of the first integrated circuit 13 and the second integrated circuit 23 may directly transmit the pairing information to the other one of the first integrated circuit 13 and the second integrated circuit 23. This eliminates the need for performing pairing again when the stylus P moves between the first panel surface 11 and the second panel surface 21, thereby enabling continuous use of the stylus P across the first panel surface 11 and the second panel surface 21.

Further, while one of the first integrated circuit 13 and the second integrated circuit 23 is performing the touch detection operation TD, the sensor system 3 according to the present embodiment restricts the other one of the first integrated circuit 13 and the second integrated circuit 23 from performing the touch detection operation TD. This point will be described in detail below with reference to FIG. 7.

Figure 7:
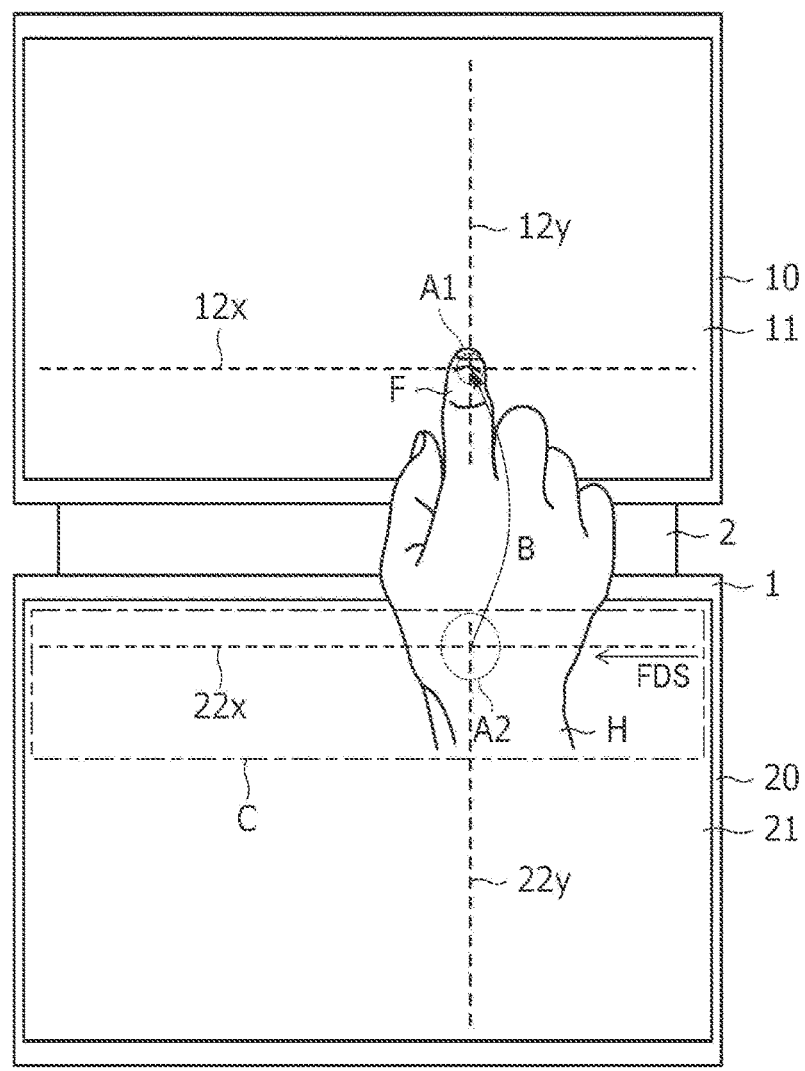
FIG. 7 is a diagram illustrating a state in which a user is sliding a finger F on a first panel surface 11 with a hand H resting on a second panel surface 21.

FIG. 7 is a diagram illustrating a state in which the user is sliding the finger F on the first panel surface 11 with a hand H resting on the second panel surface 21. In response to the user performing this operation, capacitive coupling occurs not only between the sensor electrodes 12x and 12y and the hand H in a region A1 (a region in contact with the finger F) within the first panel surface 11 illustrated in FIG. 7, but also between the sensor electrodes 22x and 22y and the hand H in a region A2 (a region in contact with the palm) within the second panel surface 21 illustrated in FIG. 7. As a result, the finger touch detection signal FDS that is being transmitted from the second integrated circuit 23 is received by the first integrated circuit 13 through a path B illustrated in FIG. 7. Such reception needs to be avoided because this causes malfunction of the first integrated circuit 13 and the host processor 30.

Accordingly, while one of the first integrated circuit 13 and the second integrated circuit 23 is performing the touch detection operation TD, the sensor system 3 according to the present embodiment restricts the other one of the first integrated circuit 13 and the second integrated circuit 23 from performing the touch detection operation TD. The restriction may be performed such that, while the coordinates of the finger F are being supplied from one of the first integrated circuit 13 and the second integrated circuit 23, the host processor 30 restricts the other one of the first integrated circuit 13 and the second integrated circuit 23 from performing the touch detection operation TD, or one of the first integrated circuit 13 and the second integrated circuit 23 that is detecting the finger F notifies the other circuit that the finger F is being detected. Accordingly, it is possible to prevent the finger touch detection signal FDS that is being transmitted from one of the first integrated circuit 13 and the second integrated circuit 23 from being received by the other one of the first integrated circuit 13 and the second integrated circuit 23.

It is noted that the first integrated circuit 13 and the second integrated circuit 23 or the host processor 30 preferably detects the area of each region where the touch is detected (the regions A1 and A2 illustrated in FIG. 7) and selects the integrated circuit to be restricted (prevented) from performing the touch detection operation TD based on the detected areas. In general, the area detected by the contact of a fingertip is smaller than the area detected by the contact of the palm and, thus, it is possible to select the integrated circuit in this way to prioritize touch input by the finger F.

Further, in restricting the touch detection operation TD, in one specific example, it suffices that the touch detection operation TD by the selected integrated circuit is completely stopped. Further, in another example, it suffices that, when the selected integrated circuit is the second integrated circuit 23, for example, the second integrated circuit 23 is controlled so as to perform the touch detection operation TD without using part of the sensor electrodes 22x (the sensor electrodes 22x in a region C illustrated in FIG. 7) close to the first sensor electrode groups 12x and 12y.

Figure 8:
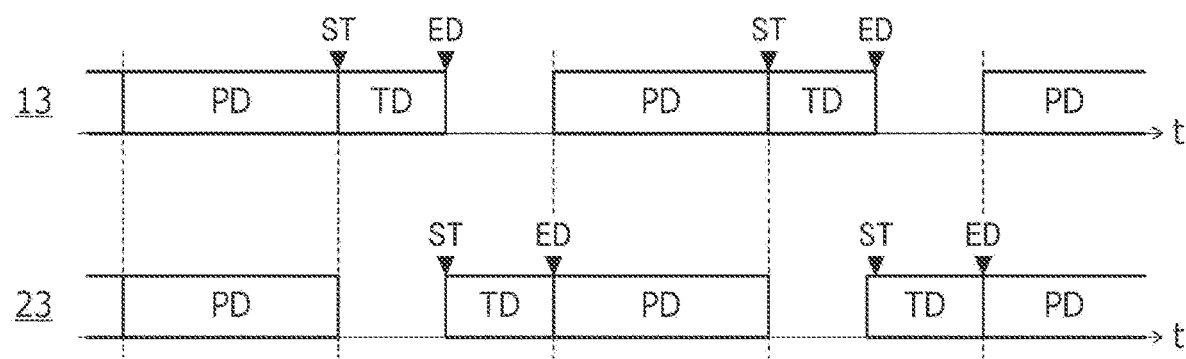
FIG. 8 is a diagram illustrating an example of restriction of the touch detection operation TD.

FIG. 8 is a diagram illustrating yet another example of the restriction of the touch detection operation TD. In this example, the second integrated circuit 23 does not perform the touch detection operation TD while the first integrated circuit 13 is performing the touch detection operation TD, and the first integrated circuit 13 does not perform the touch detection operation TD while the second integrated circuit 23 is performing the touch detection operation TD. To implement this operation, it is preferable that one of the first integrated circuit 13 and the second integrated circuit 23 notify the other one of the first integrated circuit 13 and the second integrated circuit 23 of the start timing and the end timing of the touch detection operation TD, either directly or via the host processor 30.

As described above, with the sensor system 3 according to the present embodiment, the first uplink signal US1 and the second uplink signal US2 are not transmitted at the same time. Therefore, it is possible to prevent interference between the uplink signal US transmitted from the first panel surface 11 and the uplink signal US transmitted from the second panel surface 21.

Further, with the sensor system 3 according to the present embodiment, the pairing information is shared between the first integrated circuit 13 and the second integrated circuit 23. This enables continuous use of the stylus P across the first panel surface 11 and the second panel surface 21.

Further, with the sensor system 3 according to the present embodiment, while one of the first integrated circuit 13 and the second integrated circuit 23 is performing the touch detection operation TD, the other one of the first integrated circuit 13 and the second integrated circuit 23 is restricted from performing the touch detection operation TD. Therefore, it is possible to prevent the finger touch detection signal FDS that is being transmitted from one of the first integrated circuit 13 and the second integrated circuit 23 from being received by the other one of the first integrated circuit 13 and the second integrated circuit 23.

Moreover, with the sensor system 3 according to the present embodiment, the first integrated circuit 13 and the second integrated circuit 23 each perform the touch detection operation TD in synchronization with each other. Therefore, the host processor 30 can correctly process the sequence of the position data of the finger F supplied from each of the first integrated circuit 13 and the second integrated circuit 23.

Next, a second embodiment of the present disclosure will be described. The present embodiment is different from the first embodiment in the solution to the problem described with reference to FIG. 7 and is similar to the first embodiment in other respects. Therefore, the following description continues, focusing on the difference from the first embodiment.

Figure 9A:
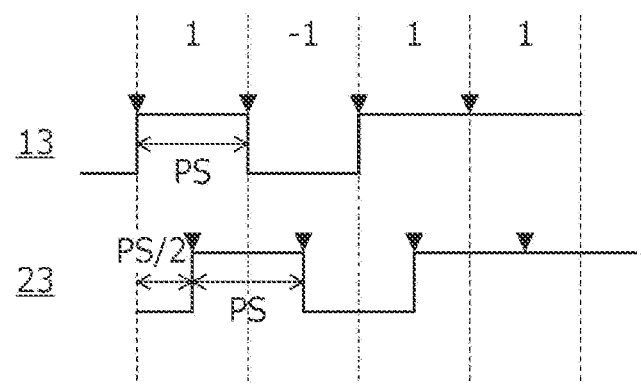
FIGS. 9A and 9B are diagrams each illustrating waveforms of the finger touch detection signal FDS according to a second embodiment of the present disclosure.
Figure 9B:
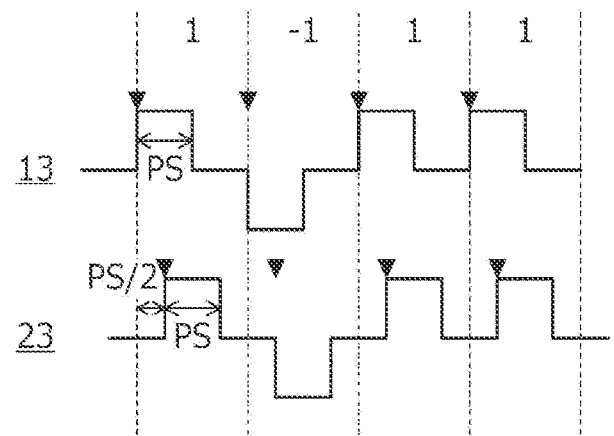

FIGS. 9A and 9B are diagrams each illustrating waveforms of the finger touch detection signal FDS according to the present embodiment. FIG. 9A illustrates the case where the finger touch detection signal FDS is made up of the signals with the waveforms illustrated in FIG. 5A. FIG. 9B illustrates the case where the finger touch detection signal FDS is made up of the signals with the waveforms illustrated in FIG. 5B.

The first integrated circuit 13 and the second integrated circuit 23 are each configured to receive the finger touch detection signal FDS by detecting a change in the signal at the edge (leading edge) of each pulse section PS. Therefore, in the present embodiment, the finger touch detection signal FDS supplied from the first integrated circuit 13 to each sensor electrode 12x (hereinafter referred to as a first finger touch detection signal FDS) and the finger touch detection signal FDS supplied from the second integrated circuit 23 to each sensor electrode 22x (hereinafter referred to as a second finger touch detection signal FDS) are each configured such that the temporal positions of the edges of their respective pulse sections PS are different from each other between the first finger touch detection signal FDS and the second finger touch detection signal FDS.

In a typical example, it suffices that the first finger touch detection signal FDS and the second finger touch detection signal FDS are made up of pulse signals having different phases from each other. For example, as illustrated in FIGS. 9A and 9B, it suffices that the first finger touch detection signal FDS and the second finger touch detection signal FDS are configured such that their respective phases are different from each other by a time PS/2 that is one half of the above-described single pulse section PS. Accordingly, the temporal positions of the edges of the pulse sections PS (timings denoted by black triangles in FIGS. 9A and 9B) can be different from each other between the first finger touch detection signal FDS and the second finger touch detection signal FDS.

In this way, the first finger touch detection signal FDS and the second finger touch detection signal FDS are configured such that the temporal positions of the edges of their respective pulse sections PS are different from each other between the first finger touch detection signal FDS and the second finger touch detection signal FDS. Accordingly, at a timing when one of the first integrated circuit 13 and the second integrated circuit 23 performs the operation of detecting a signal change, a signal corresponding to the other circuit always remains unchanged. Therefore, it is possible to prevent the finger touch detection signal FDS that is being transmitted from one of the first integrated circuit 13 and the second integrated circuit 23 from being received by the other one of the first integrated circuit 13 and the second integrated circuit 23.

It is noted that, instead of the phases of the first finger touch detection signal FDS and the second finger touch detection signal FDS, their frequencies (i.e., the time length of the pulse section PS) may be different from each other. In this way, the temporal positions of the edges of the pulse sections PS can also be substantially, though not completely, (that is, at most of the timings) different from each other between the first finger touch detection signal FDS and the second finger touch detection signal FDS.

Further, in addition to each configuring the first finger touch detection signal FDS and the second finger touch detection signal FDS such that their respective rising and falling time lengths are different from each other between the first finger touch detection signal FDS and the second finger touch detection signal FDS, the first integrated circuit 13 and the second integrated circuit 23 may be each configured to receive only the finger touch detection signal FDS of a specific frequency by using a band-pass filter that passes only a signal of the specific frequency, for example. In this way, it is also possible to prevent the finger touch detection signal FDS that is being transmitted from one of the first integrated circuit 13 and the second integrated circuit 23 from being received by the other one of the first integrated circuit 13 and the second integrated circuit 23.

Further, if an increase in bit lengths of the above-described signals $s_1$ to $s_K$ is acceptable, all of the signals $s_1$ to $s_K$ transmitted from the first integrated circuit 13 and the signals $s_1$ to $s_K$ transmitted from the second integrated circuit 23 may be made up of code strings orthogonal to each other. In this way, each of the first integrated circuit 13 and the second integrated circuit 23 can receive each signal in a distinguished manner by calculating correlation with the orthogonal code strings stored in advance. Accordingly, similarly to the description above, it is possible to prevent the finger touch detection signal FDS that is being transmitted from one of the first integrated circuit 13 and the second integrated circuit 23 from being received by the other one of the first integrated circuit 13 and the second integrated circuit 23.

Although the preferred embodiments of the present disclosure have been described above, the present disclosure is by no means limited to the above-described embodiments. As a matter of course, the present disclosure can be implemented in various modes without departing from the scope of the present disclosure.

For example, the first integrated circuit 13 and the second integrated circuit 23 may transmit their respective uplink signals US with the same content at the same timing. In other words, the first integrated circuit 13 and the second integrated circuit 23 may be integrally operated. In this way, it is also possible to prevent interference between the uplink signal US transmitted from the first panel surface 11 and the uplink signal US transmitted from the second panel surface 21. In this case as well, as to the touch detection operation TD, it is preferable to ensure that, in the way described above, the finger touch detection signal FDS that is being transmitted from one of the first integrated circuit 13 and the second integrated circuit 23 is not received by the other one of the first integrated circuit 13 and the second integrated circuit 23.

It is noted that, when both the first panel surface 11 and the second panel surface 21 are configured by touch displays employing the in-cell system described above and the first integrated circuit 13 and the second integrated circuit 23 transmit their respective uplink signals US with the same content at the same timing as described above, it is preferable to synchronize vertical synchronization signals VSync indicating a screen rewriting timing. That is, with the touch displays employing the in-cell system, the sensor system 3 can perform the pen detection operation PD and the touch detection operation TD only during a blank period in which a pixel driving operation is not performed. Therefore, in order for the first panel surface 11 and the second panel surface 21 to transmit their respective uplink signals US at the same timing, the temporal positions of the blank periods need to match between the first panel surface 11 and the second panel surface 21. By synchronizing the vertical synchronization signals VSync with each other as described above, the temporal positions of the blank periods can match.

Further, the first uplink signal US1 and the second uplink signal US2 may be made up of signals modulated by using code strings orthogonal to each other. In this way, the stylus P can receive the first uplink signal US1 and the second uplink signal US2 in a distinguished manner by calculating the correlation with the orthogonal code strings stored in advance. Therefore, similarly to the description above, it is possible to prevent interference between the uplink signal US transmitted from the first panel surface 11 and the uplink signal US transmitted from the second panel surface 21. It is noted that, when, in this case, the stylus P receives both the first uplink signal US1 and the second uplink signal US2, it is preferable that the stylus P select one of the first uplink signal US1 and the second uplink signal US2 and perform pairing with the integrated circuit that corresponds to the selected one. For example, it suffices that the stylus P selects one of the first uplink signal US1 and the second uplink signal US2 that exhibits a greater reception strength.

DESCRIPTION OF REFERENCE SYMBOLS

1: Electronic device
2: Connecting portion
3: Sensor system
10: First housing
11: First panel surface
12$x$, 12$y$: First sensor electrode group
13: First integrated circuit
13$a$: Shift register
13$b$: Correlator
14$x$, 14$y$: First lead-out wire
20: Second housing
21: Second panel surface
22$x$, 22$y$: Second sensor electrode group
23: Second integrated circuit
24$x$, 24$y$: Second lead-out wire
30: Host processor
31 to 33: Wire (Line/Trace)
A1: A region in contact with a finger F
A2: A region in contact with a palm
DS: Downlink signal
F: Finger
FDS: Finger touch detection signal
H: Hand
INT: A time length of an interval for transmitting an uplink signal US
P: Stylus
P1: Uplink signal US transmission/reception period
P2: Downlink signal DS transmission/reception period p₁ to p₄: Pulse group
PD: Pen detection operation
PS: Pulse section
$s_1$ to $s_K$: Signal
T1: A time length of a period in which a first uplink signal US1 is transmitted
$T_1$ to $T_4$: Correlation value
T2: A time length from the beginning of the pen detection operation PD to the start of transmission of a second uplink signal US2
T3: A time length from the end of transmission of the second uplink signal US2 to the start of a touch detection operation TD
T4: A time length of a period in which the touch detection operation TD is performed
TD: Touch detection operation
TS1 to TSn: Time slot
US: Uplink signal
US1: First uplink signal
US1a: A range that the first uplink signal US1 can reach
US2: Second uplink signal
US2a: A range that the second uplink signal US2 can reach

The invention claimed is:

1. A sensor system comprising:
a first sensor electrode group and a first integrated circuit connected to the first sensor electrode group; and
a second sensor electrode group and a second integrated circuit different from the first integrated circuit and connected to the second sensor electrode group,
wherein the first sensor electrode group is disposed under a first panel surface and the second sensor electrode group is disposed under a second panel surface different from the first panel surface, and the first panel surface is rotatable with respect to the second panel surface,
wherein, when the first integrated circuit is paired with a stylus, the first integrated circuit shares pairing information regarding the pairing, with the second integrated circuit,
wherein a reach of a first uplink signal transmitted from the first integrated circuit via the first sensor electrode group overlaps with a reach of a second uplink signal transmitted from the second integrated circuit via the second sensor electrode, responsive to the first panel surface, from which the first uplink signal is transmitted, being rotated to assume an angle less than 180 degrees relative to the second panel surface, from which the second uplink signal is transmitted, and
wherein the first and second integrated circuits are controlled such that the first uplink signal is transmitted from the first panel surface at a first timing and the second uplink signal is transmitted from the second panel surface at a second timing which alternates with the first timing.

2. The sensor system according to claim 1, wherein the pairing information is information that specifies each of a local pen identifier, a time slot, and a frequency that are allocated to the stylus by the first integrated circuit.

3. The sensor system according to claim 1, further comprising:
a host processor connected to the first and second integrated circuits,
wherein, in sharing the pairing information between the first and second integrated circuits, the first integrated circuit transmits the pairing information to the host processor and the host processor transmits the pairing information to the second integrated circuit.

4. The sensor system according to claim 1, wherein, in sharing the pairing information between the first and second integrated circuits, the first integrated circuit transmits the pairing information to the second integrated circuit.

5. The sensor system according to claim 1, further comprising:
a first housing including a first panel surface; and
a second housing including a second panel surface, wherein
the first integrated circuit is disposed in the first housing, and the second integrated circuit is disposed in the second housing.

6. The sensor system according to claim 5, wherein the first housing is rotatable with respect to the second housing.

7. The sensor system according to claim 5, wherein the first housing is connected to the second housing by a connecting portion, and the connecting portion includes a hinge.

* * * * *